Oct. 7, 1924.
H. R. STRAIGHT
DEVICE FOR HANDLING PLASTIC BRICK
Filed July 6, 1920
1,510,717
3 Sheets-Sheet 1
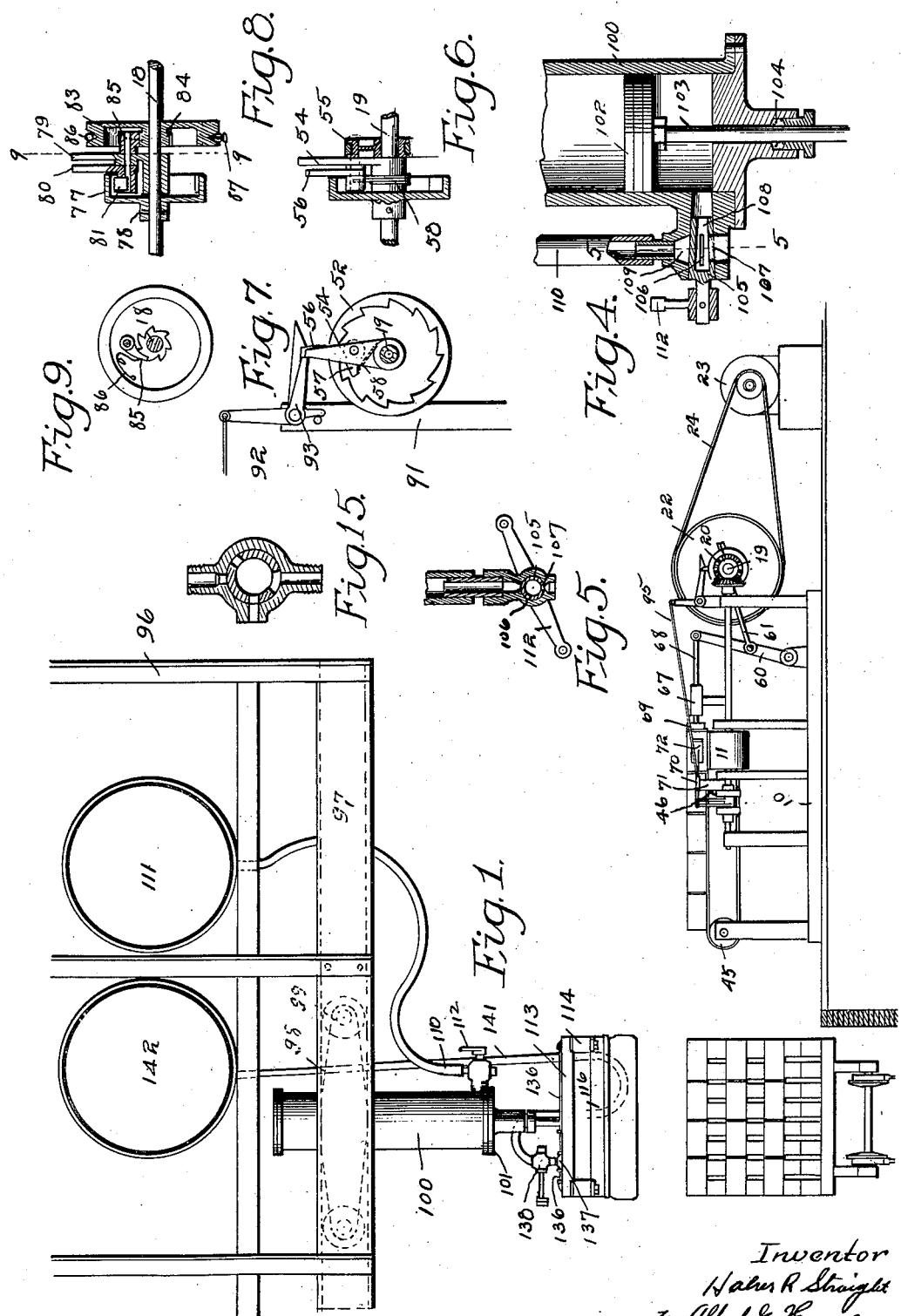

Oct. 7, 1924.
H. R. STRAIGHT
1,510,717
DEVICE FOR HANDLING PLASTIC BRICK
Filed July 6, 1920 3 Sheets-Sheet 2
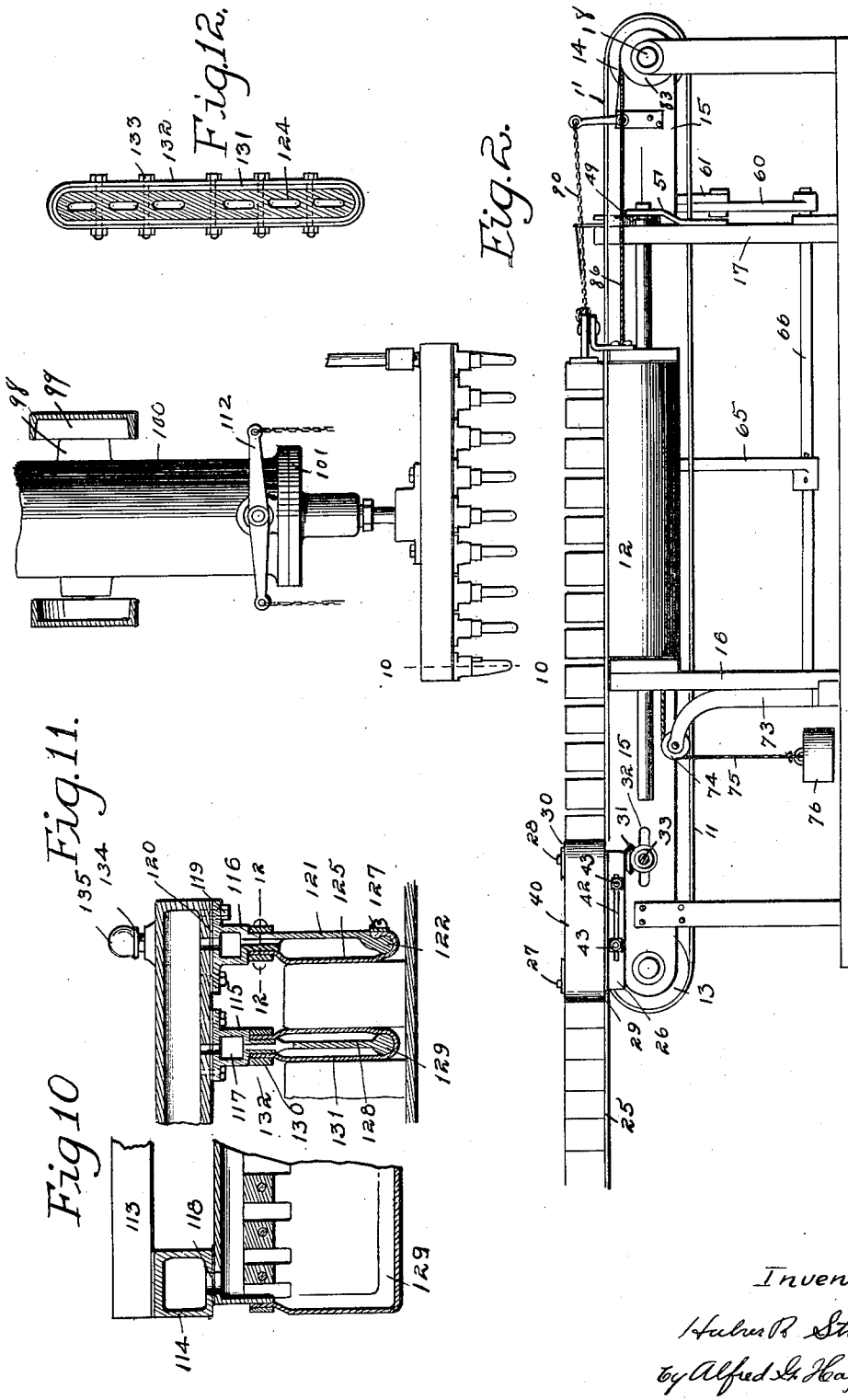

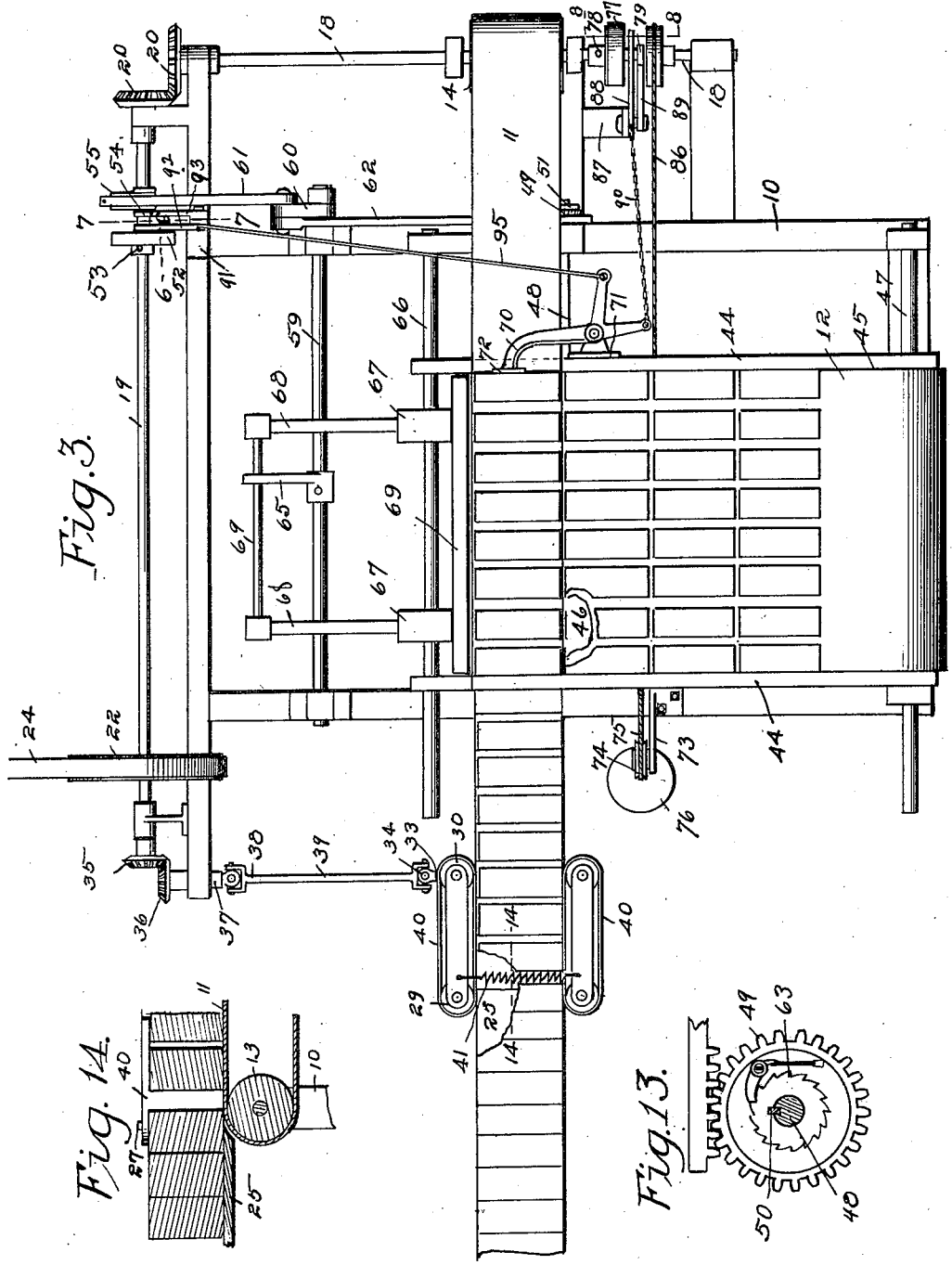

Patented Oct. 7, 1924.

1,510,717

UNITED STATES PATENT OFFICE.

HALVER R. STRAIGHT, OF ADEL, IOWA.

DEVICE FOR HANDLING PLASTIC BRICK.

Application filed July 6, 1920. Serial No. 394,345.

*To all whom it may concern:*

Be it known that I, HALVER R. STRAIGHT, a citizen of the United States, residing at Adel, in the county of Dallas, State of Iowa, have invented a Device for Handling Plastic Brick, of which the following is the specification.

This invention relates to improvements in devices for handling plastic brick, and the like, particularly adapted to be used in connection with automatic cutting devices designed to cut brick from a continuously moving column of plastic material.

The object of my invention is to provide a mechanical device of simple, durable, and inexpensive construction adapted to simultaneously pick up a number of plastic brick, or the like, from the table of an automatic cutter, and deliver them to, and place them on a drier car.

A further object is to provide in a mechanical device for handling plastic brick, improved means for simultaneously gripping a number of rows of plastic bricks.

A further object is to provide in a mechanical means for simultaneously picking up a number of plastic brick, from a cutter table, improved means for separating and arranging the brick in equi-distant rows.

These and other objects will be apparent to those skilled in the art, that need not be mentioned in detail.

Fig. 1. is a side elevation of my improved device for handling plastic brick.

Fig. 2. is an end elevation of the same.

Fig. 3. is a plan view showing the device for separating and arranging the brick.

Fig. 4. is a sectional detail view showing the lower end of the lifting cylinder with its valve control.

Fig. 5. is a sectional view taken on the line 5—5 of Fig. 4.

Fig. 6. is a detail sectional view taken on the line 6—6 of Fig. 3.

Fig. 7. is a detail sectional view taken on the line 7—7 of Fig. 3.

Fig. 8. is a detail sectional view taken on the line 8—8 of Fig. 3.

Fig. 9. is a detail sectional view taken on the line 9—9 of Fig. 8.

Fig. 10 is a detail sectional view taken on the line 10—10 of Fig. 2.

Fig. 11 is a detail view showing two of the lifting diaphragms in transverse section.

Fig. 12. is a detail sectional view taken on the line 12—12 of Fig. 11.

Fig. 13. is a detail view showing the mechanism for operating one of the conveyors, in elevation.

Fig. 14. is a detail sectional view taken on the line 14—14 of Fig. 3.

To accomplish the above objects I have provided the following mechanism, this mechanism is designed to perform two somewhat distinct operations. The ordinary mechanism for cutting plastic brick, deliver it to a table in a continuously moving row of bricks adjacent to each other. The first operation of my device pertains to separating the bricks and arranging them in a group, having a series of equi-distant and parallel rows, on the table in such a manner as they may be easily, quickly and simultaneously grasped. The second part of the operation pertains to grasping, elevating and delivering the brick to a drier car.

The first operation will be described first: The numeral 10 indicates a frame upon which is mounted conveyors 11 and 12. The conveyor 11 is arranged longitudinally with the moving column of brick, and adjacent to the end of the cutter table, and is mounted on the rollers 13 and 14, which are in turn rotatively mounted in the frame members 15. These frame members terminate with the posts 16 and 17 so that a space is provided between them for the operation of the conveyor 12.

The pulley 14 is driven by and is mounted on a shaft 18, which is in turn mounted in suitable bearings. Arranged transversely to the shaft 18, I have provided a shaft 19, said shafts being operatively connected by bevel gears, 20. The shaft 19 is driven through a belt wheel 22 from a motor 23 by means of the belt 24. When the motor 23 is operated, a pulley 14 will be rotated in a clockwise direction as viewed in Fig. 2. The pulley 14 is rotated at such a speed that the conveyor 11 will be moved slightly faster than the moving column of plastic brick, which are carried by the stationary plate 25. By this arrangement it will be seen that the brick will be delivered to the conveyor 11 slightly spaced apart. It has been proven by experiment that brick thus delivered are not spaced equi-distantly apart, due to the fact that when the brick is being delivered from the end of the stationary chute or plate each individual brick will reach a positon as shown in Figure 14 of the drawings, where one half of the brick rests on the end of the plate 25, and the other half on the conveyor 11. On account of the conveyor 11 moving at a speed somewhat higher than that of the brick, there will be a tendency for the brick to be pulled forward at a speed greater than that of an adjacent brick behind it, thru the friction of the conveyor 11 and the engaging portion of the brick. The other half of the brick is also in frictional engagement with the plate 25, a certain amount of slippage will result between the conveyor 11 and the surface of the brick, until the brick has been advanced out of engagement with the said plate, this slippage will result in an unequal spacing of the bricks on the said conveyor.

To overcome the above difficulty I have provided the following mechanism:

Adjustably mounted on each of the members 15 and near the receiving end, I have provided a plate 26. Each end of the plate 26 carries a vertical and rotatively mounted shaft 27 and 28, each of which are designed to carry a pulley, 29 and 30 respectively. The lower end of each of the shafts 27 and 28 are provided with a bevel gear 31. Rotatively mounted in the plates 26 and in the slots 22 of the members 15, I have provided a shaft 33, one end of which is provided with a universal joint 34, the forward end of the shaft 19 is provided with a bevel gear 35 designed to mesh with a bevel gear 36, mounted on a transversely arranged shaft 37, the opposite end of which is provided with a universal joint 38. The shafts 33 and 37 are substantially in line with each other and have their universal joints operatively connected by means of a shaft 39. Each set of pulleys 29 and 30 are provided with a belt 40, the pulleys 29 are so arranged relatively to the end of the conveyor 11 that the said belts 40 will engage the ends of the brick at a point slightly ahead of the back end of the plate 25. The conveyors 40 are held in engagement with the plastic brick by means of a spring 41. The speed of the conveyor 11, is designed to be equal to that of the belts or conveyors 40, both of which are slightly greater than the speed of the moving column of brick delivered by the cutting device. Thus it will be seen that as the said conveyors are operated, they will cause the engaging bricks to be spaced slightly apart, and the pressure between the conveyors 40, together with the frictional engagement with the belt 11, will be sufficient to overcome the dragging tendency imparted by the plate 25, the plates 26 are provided with a slot 42, said slots designed to receive bolts 43. By this arrangement it will be seen that the plates 26 may be moved forward or rearward relative to the conveyor 11, this is for the purpose of finding the proper positions for the conveyors 40, when the machine is being operated, in order that the conveyors 40 may engage the brick while passing over the end of plate 25.

Adjacent to one side of the conveyor 11, I have provided what I shall term an accumulating conveyor 12. This conveyor is for the purpose of receiving a quantity or group of bricks, for the purpose of providing means whereby the whole group may be grasped, elevated, and delivered to a drier car. The conveyor 12 is mounted in a frame 44 which is designed to carry conveyor pulleys 45 and 46, the pulley 45 is rigidly secured to a shaft 47 and is slidably mounted in the main frame 10, the pulley 46 is provided with a similar shaft 48, which has one end key seated, the key seated end being slidably in a ratchet 63 and a pinion 49. Said ratchet being provided with a key 50, and held against longitudinal movement by means of a bracket 51. For driving the conveyor 12, I have provided a ratchet trip device having a ratchet wheel 52, this ratchet is secured to the shaft 19 by means of a pin 53, rotatively mounted on a shaft 19, I have provided an arm 54, designed to carry an eccentric 55, pivotally secured to the arm 54, I have provided a pawl member 56, having a dog 57 designed to engage the ratchet of the wheel 52. The said dog is provided with a spring 58, which is so mounted that the dog has a tendency to engage the ratchets of the wheel 52. Pivotedly mounted in the main frame I have provided a shaft 59 having an arm 60, secured to one end. A link 61 has one end pivotedly secured to the arm 60, and the opposite end operatively connected with the eccentric 55, a rack bar 62 has one end pivoted to the upper end of the arm 60, the opposite end is operatively connected with the pinion 49. This pinion 49 is operatively connected with a ratchet 63, the said ratchet being operatively connected with the shaft 48, by means of the key 50. Secured near the central portion of the shaft 59 I have provided an upright arm 65. The frame members 44 are designed to extend beneath the conveyor 11 and have a shaft 66 which is slidably mounted in the main frame, secured to the shaft 66 I have provided bearing members 67, each of which are designed to have slidably mounted a shaft 68, the inner ends of the shaft 68 are provided with a plate 69, this plate is designed to rest parallel to the ends of the spaced brick and in line therewith, as clearly shown in Figs. 1 and 3. The outer ends of the shaft 68 are provided with a transverse shaft 69, slidably mounted in the upper end of the arm 65, pivotedly secured to the rear side of the frame 44, I have provided a trip arm 70 pivotedly mounted to a bracket 71, the arm 70 has provided at one end a plate 72 designed to rest operatively above the central portion of the conveyor 11 and in line with the rear edge of the conveyor 12, secured to the frame 10 near the forward edge of the conveyor 12 I have provided a bracket 73 designed to carry a pulley 74. This pulley 74 is designed to carry a cable 75, one end of which is secured to the forward side of the frame 44. The opposite end of the cable 75 is provided with a weight 76, this is for the purpose of normally holding and returning the frame 44 to its forward limit of movement. For moving the frame 44 forward, I have provided a ratchet device on the shaft 18 which comprises a ratchet wheel 77 secured to said shaft by means of a pin 78, an arm 79 is rotatively mounted on the shaft 18 adjacent to the ratchet 77, and has pivotedly secured to one side a pawl 80 provided with a dog 81, rotatively mounted on a shaft 18 adjacent to the arm 79, I have provided a sheave 83, this sheave is provided with a ratchet 84. Pivotedly mounted to the arm 79 I have provided a dog 85, designed to engage the ratchet 84 and be held in such engagement by means of a spring 86. The sheave 83 is designed to have one end of a cable 86 secured to it by means of a pin 87, the said cable is then passed around the sheave, and has the opposite end secured to the rear side of the frame 44. Pivotedly secured to a bracket 87, I have provided a latch 88 designed to engage the upper end of the pawl 80. Pivotedly secured to the same bracket, I have provided a dog 89 designed to engage the upper end of the arm 79. The upwardly projecting portion of the latch 88 is operatively connected with the trip arm 70 by means of a chain 90. Pivotedly secured to the upper end of the post 91 of the frame 10, I have provided a latch 92 operatively connected with the upper end of the pawl 56. Mounted upon the same pivot I have provided a pawl 93 designed to engage one side of the upper end of the arm 54, the upper projecting portion of the latch 92 is operatively connected with the rearward projecting portion 94 of the arm 70, by means of a rod 95.

The operation of the accumulating and separating portion of my device is as follows:

Assuming that a column of plastic and adjacent series of brick is being fed at a uniform speed upon the plate 25, and that the conveyor belt 11 is being driven at a speed, slightly greater than the said column of adjacent bricks, by means of the motor 23 and the various gear devices described. The conveyors 40 will then be moved at a speed equal to the speed of the conveyor 11. The brick at the forward end of the moving column of adjacent brick will have their ends engaged by the conveyors 40 slightly before the central portion of the end brick is over the end of the plate 25 as shown in Figs. 3 and 14. The pressure between the sides of the brick and the conveyors 40 is sufficient to overcome the friction of the plate 25 due to the fact that a greater amount of pressure is applied to the conveyors 40 by means of the spring 41, than is applied to the plate 25 due to the weight of the brick. The increased speed of the said conveyors will cause the brick to be separated a slight distance as shown by Figs. 2 and 3. As the conveyor 11 is operated, the column of separated brick will be moved rearward until the first brick engages the plate 72 of the trip arm 70, this will cause the rod 95 to be moved, lifting the latch 92, thus permitting the dog 57 to engage the ratchets of the wheel 52, this in turn will cause the eccentric 55 to be rotated which in turn will oscillate the arm 60 thru the bar 61. The shaft 59 will be oscillated causing the arm 65 to also be oscillated, this in turn will cause the plate 69 to engage the adjacent ends of eight of the bricks and to slide them transversely from the conveyor 11 to the conveyor 12, the said conveyor 12 being caused to rotate thru the action of the pinion 49 and the ratchet 63. The said pinion being operated by the rack bar 62. As the lever 70 is operated, the chain 90 will be pulled which will cause the latch 88 to be elevated, at the same time the latch 92 is elevated. As the latch 88 is elevated it will dis-engage the upper end of the pawl 80 thereby permitting the dog 81 to engage the ratchets of the wheel 77 and also permit the dog 85 to engage the ratchets 84 of the sheave 83. The rotation of the sheave 83 will cause the frame 44 to be moved rearward at a speed equal to the speed of the belt 11, this permits the plate 69 to travel with the frame and the brick, as the said brick are transversely moved from the said conveyor. It will be noted from the construction of the ratchet device 52, that as the arm 54 makes one complete revolution the latch 92 will engage the upper end of the pawl 56 causing the dog 57 to again disengage the ratchet, at which time the arm 54 will move under the pawl 93 preventing a backward movement of said arm against the action of the spring 58. The eccentric 55 will be stopped with the plate 69 at its normal position. It will be seen that a similar action will take place between the latch 88 and the pawl 89 and their engaging members, this will permit the dog 85 to disengage the ratchet 84, allowing the sheave 83 to rotate in an opposite direction due to the weight 76, and the frame 44 return to its normal position. Thus it will be seen that a number of rows of equidistant brick may be automatically placed upon the conveyor 12 in such a manner that the bricks of one row will be in absolute line with those of an adjacent row. The conveyor 11 is preferably made of some substance having a hard smooth surface which may be lubricated by oil or water.

I will now describe the mechanism for performing the second part of my operation, which consists in simultneously grasping the whole group of brick accumulated on the conveyor 12, elevating and delivering them to a drier car, then lowering them into position on said car, and simultaneously releasing them from the said conveying mechanism. To accomplish this I have provided a frame 96, the said frame being provided with horizontally arranged channel irons 97. These channel irons 97 are designed to carry a truck 98 having rollers 99 engaging the flanges of said channels. The truck 98 is designed to carry a cylinder 100 provided with a detachable head 101 at its lower end, the said cylinder 100 is provided with a piston 102 having a piston rod 103, slidably mounted in a packing 104 of the head 101. The lower end of the cylinder 100 is also provided with an oscillating valve 105 having intake and outlet ports 106 and 107 respectively, the said ports being designed to communicate with the passage 108. The intake port 106 is designed to communicate with the passage 109 which in turn communicates with an air pipe 110 in communication with an air tank 111. The valve 105 is provided with an operating arm 112, the lower end of the piston rod 103 is secured to a bar 113, each end of which is in turn secured to a tubular bar 114, these bars 114 are arranged parallel to each other and are designed to carry a series of equidistant diaphragm members, 115 and 116. The spacing of these members are equal to the spacing of the bricks, on the conveyor 12. Each of the members 115 and 116 are provided with an air passage 117, each end of which communicates with the members 114 by means of passages 118, members 115 and 116 are secured to members 114 by means of bolts 119, so that said members may be easily and quickly removed for repair. A packing strip is provided between said members to form an air tight joint. The members 116 are designed to be mounted at the ends of members 114 while the members 115 are designed to be mounted between the members 116. The members 116 are each provided with a side plate 121, the lower edge of which is off-set slightly inward and provided with a cylindrical rib 122, the upper edge of the plate 121 is provided with a flange 123 having a series of slots 124. The inner face of the flange 123 is designed to receive a diaphragm 125 the upper edge of which is secured in position by means of a plate 126. The lower edge of the diaphragm is placed around the cylindrical rib 122 and secured thereto by means of a plate 127, the ends of the diaphragm 127 are secured in the same manner.

The members 115 are each provided with a plate 128 having a rib 129 at its lower edge. The upper edge of the said plate 128 is provided with flanges 130, each of which is designed to receive the upper edge of a diaphragm 131. This diaphragm 131 is a continuous piece that extends loosely around the rib 129, the diaphragm being of such a length that it will engage the rib 129 when it is in its expanded position. The said diaphragm 131 is secured to the flanges 130 by means of U shaped strips 132 and secured thereto by means of bolts 133. One end of each of the members 114 is provided with a nipple 134. Each of the nipples 134 are provided with an elbow 135, which are in turn operatively connected with pipe 136, said pipe being designed to have a T 137. The T 137 is connected to a valve 138 which is provided with an intake port 139, and an exhaust port 140. The intake port is in communication with a flexible pipe 141 which is in turn in communication with the tank 142.

The operation of my lifting devices is as follows:

Assuming that the proper number of brick have been placed on the conveyor 12 and that the lifting device is in the position shown in Fig. 2, and that air is in communication with lower side of the piston 102 from the tank 11, that the exhaust port 107 of the valve 105 is slightly open, and that the intake port 106 is closed, then the piston 102 will move downward which will permit the diaphragm 131 to move downward into the spaces between the bricks while the diaphragms 125 will move adjacent to the outside faces of the outside rows of bricks. The valve 138 will then be operated so that the intake port 139 will be in communication with pipe 141, this will permit air from the tank 142 to pass into the pipe 136, from thence into the members 114 and from there into the air passages 117 of the members 115 and 116, then downward thru the opening 124, causing the diaphragm members 131 and 125 to be expanded, this will cause them to grip the adjacent faces of the brick with pressure sufficient to lift the said bricks. Thus it would be seen that the whole group of bricks on the conveyor 12 will be simultaneously grasped. It will of course be understood that each of the diaphragms are equal to the length of each of the rows of bricks. The valve 105 is then operated thru the handle 112 so that the valve 105 will be oscillated and the intake port 106 moved in communication with the intake passage 109, this will permit air to pass from the tank 111 which is under a considerable higher pressure than the air within the tank 142. Air will pass through the passage 108 and beneath the piston 102 causing the said piston to be elevated together with the gripping device, after the said device has been elevated sufficiently to clean the incoming bricks on the conveyor 111, the valve 105 will be moved to a neutral position where both the intake and exhaust ports will be closed. The truck 98 will then be moved manually to a position where the center of the cylinder 100 will be above the center of the car to be loaded. The valve 105 may then be moved so that the exhaust port is slightly opened so that the loaded brick may be lowered in position on said car. Each alternate layer of brick may be arranged with their rows of brick in a transverse manner to each immediate layer of brick, as shown in Fig. 1. This is accomplished by turning the supporting device which will be permitted by the piston 102 rotating within the cylinder 100. The valve 138 will then be moved to a position so that the exhaust port is opened, this will permit the air within the diaphragm to escape and the bricks released. The tanks 142 and 111 may be filled with compressed air by any convenient air compressor, which is of the ordinary construction and provided with the necessary pressure regulating devices.

Thus it will be seen I have provided a comparatively simple and inexpensive device which may be attached to the ordinary cutting tables, which will provide means, whereby a single operator will very efficiently and rapidly handle a large number of plastic brick.

Having thus described my invention I claim:

1. The combination of a cutter table having a continuously moving column of adjacent plastic brick, a receiving conveyor, arranged longitudinally with said column, means for driving said receiving conveyor at a speed slightly above that of said column, a conveyor at each side of said column, designed to engage the sides of said bricks at a point just ahead of the delivery end of said table, and means for driving said side conveyors at a speed equal to that of the receiving conveyor.

2. The combination of a cutter table having a continuously moving column of adjacent plastic brick, a receiving conveyor, arranged longitudinally, with said column, means for driving said receiving conveyor at a speed slightly above that of said column, a conveyor at each side of said column designed to engage the sides of said bricks at a point just ahead of the delivery end of said table, means for driving said side conveyors at a speed equal to that of the receiving conveyor, and means for adjusting the said side conveyors longitudinally, relative to said column.

3. Means for separating the bricks of a series of adjacent bricks, in a continuously moving column and spacing them equi-distantly apart, said means comprising a receiving conveyor, arranged longitudinally, with said column, means for driving said receiving conveyor at a speed slightly above that of said column, a conveyor at each side of said column designed to engage the sides of said bricks at a point just ahead of the delivery end of said table, and means for driving said side conveyors at a speed equal to that of the receiving conveyor.

4. Means for separating the bricks of a series of adjacent bricks, in a continuously moving column and spacing them equi-distantly apart, said means comprising a receiving conveyor, arranged longitudinally, with said column, means for driving said receiving conveyor at a speed slightly above that of said column, a conveyor at each side of said column designed to engage the sides of said bricks at a point just ahead of the delivery end of said table, means for driving said side conveyors at a speed equal to that of the receiving conveyor, and means for adjusting the said side conveyors longitudinally, relative to said column.

5. Means for separating the bricks of a series of adjacent bricks, in a continuously moving column and spacing them equi-distantly apart, said means comprising a receiving conveyor, arranged longitudinally, with said column, means for driving said receiving conveyor at a speed slightly above that of said column, a conveyor at each side of said column designed to engage the sides of said bricks at a point just ahead of the delivery end of said table, means for driving said side conveyors at a speed equal to that of the receiving conveyor, means for adjusting the said side conveyors longitudinally, relative to said column, and means for moving a pre-determined number of equi-distant bricks from said column and arranging them into groups having a series of parallel and equi-distant rows of brick.

6. The combination of a cutter table having a continuously moving column of adjacent plastic brick, a receiving conveyor, arranged longitudinally, with said column, means for driving said receiving conveyor at a speed slightly above that of said column, a conveyor at each side of said column designed to engage the sides of said bricks at a point just ahead of the delivery end of said table, means for driving said side conveyors at a speed equal to that of the receiving conveyor, and means for moving a pre-determined number of equi-distant bricks from said column and arranging them into groups having a series of parallel and equi-distant rows of brick.

7. The combination of a cutter table having a continuously moving column of adjacent plastic brick, a receiving conveyor, arranged longitudinally with said column, means for driving said receiving conveyor at a speed slightly above that of said column, a conveyor at each side of said column designed to engage the sides of said bricks at a point just ahead of the delivery end of said table, means for driving said side conveyors at a speed equal to that of the receiving conveyor, an accumulating conveyor capable of longitudinal and transverse movement relative to the movement of said receiving conveyor, and means for advancing the said accumulating conveyor, transversely, means for moving said accumulating conveyor longitudinally, a trip device for simultaneously setting both of the last said devices into operation.

8. The combination of a cutter table having a continuously moving column of adjacent plastic brick, a receiving conveyor, arranged longitudinally with said column, means for driving said receiving conveyor at a speed slightly above that of said column, a conveyor at each side of said column designed to engage the sides of said bricks at a point just ahead of the delivery end of said table, means for driving said side conveyors at a speed equal to that of the receiving conveyor, means for adjusting the said side conveyors longitudinally, relative to said column, an accumulating conveyor capable of longitudinal and transverse movement relative to the movement of said receiving conveyor, means for advancing the said accumulating conveyor transversely, and means for moving said accumulating conveyor longitudinally, a trip device for simultaneously setting both of the last said devices into operation.

9. The combination of a cutter table having a continuously moving column of adjacent plastic brick, a receiving conveyor, arranged longitudinally with said column, means for driving said receiving conveyor at a speed slightly above that of said column, a conveyor at each side of said column designed to engage the sides of said bricks at a point just ahead of the delivery end of said table, means for driving said side conveyors at a speed equal to that of the receiving conveyor. Means for moving a pre-determined number of equi-distant bricks from said column and arranging them into groups having a series of parallel and equi-distant rows of brick, said means comprising an accumulating conveyor capable of longitudinal and transverse movement relative to the movement of said receiving conveyor, means for advancing the said accumulating conveyor transversely, and means for moving said accumulating conveyor longitudinally, a trip device for simultaneously setting both of the last said devices into operation.

HALVER R. STRAIGHT.